A. THODE.
AUTOMATIC ELECTRIC SWITCH.
APPLICATION FILED OCT. 21, 1913.
1,235,859.  Patented Aug. 7, 1917.
4 SHEETS—SHEET 4.
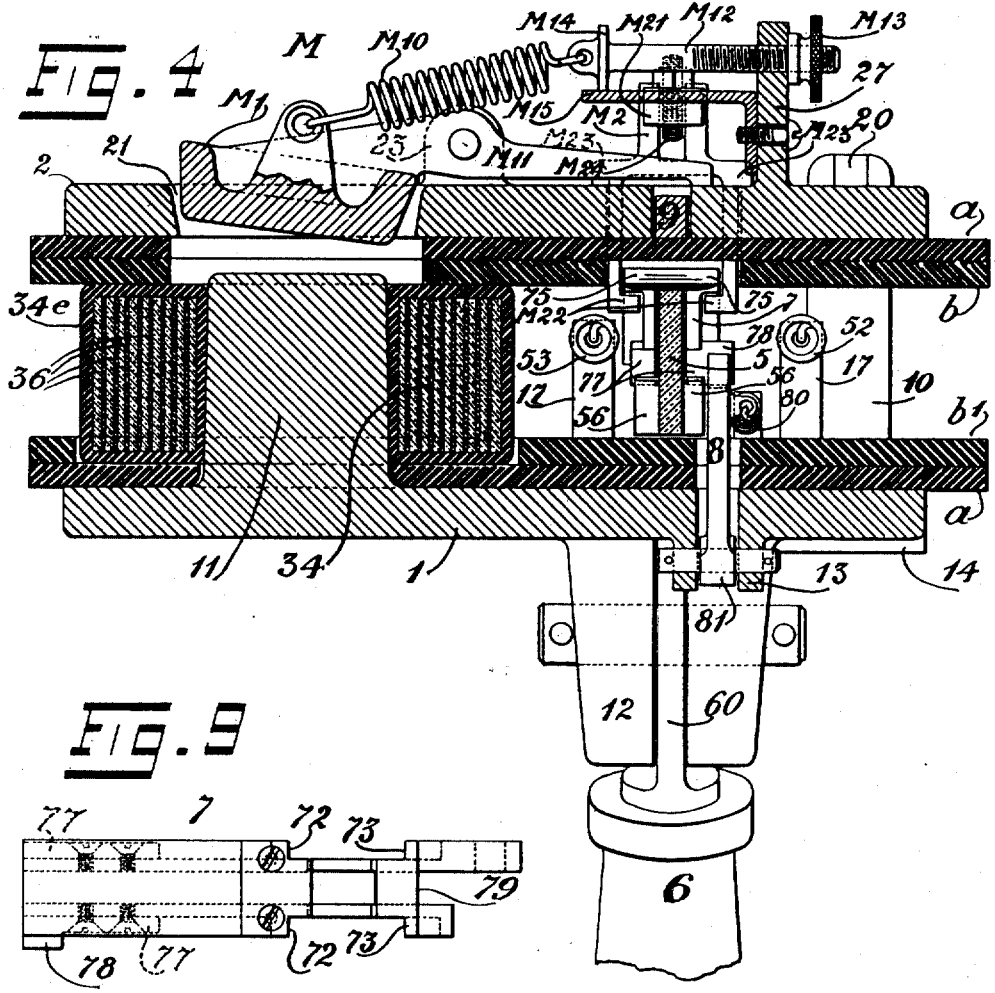
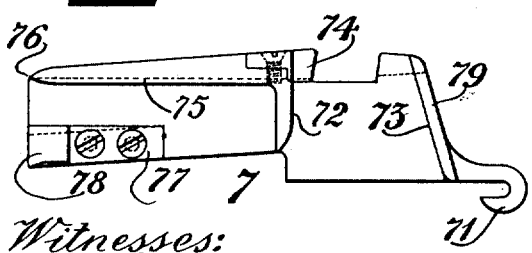
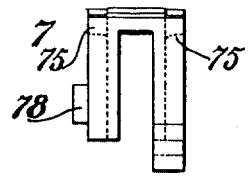
Witnesses:
A. C. Heiny
H. J. Penney
Inventor:
Albert Thode
By his Attorney, F. H. Richards

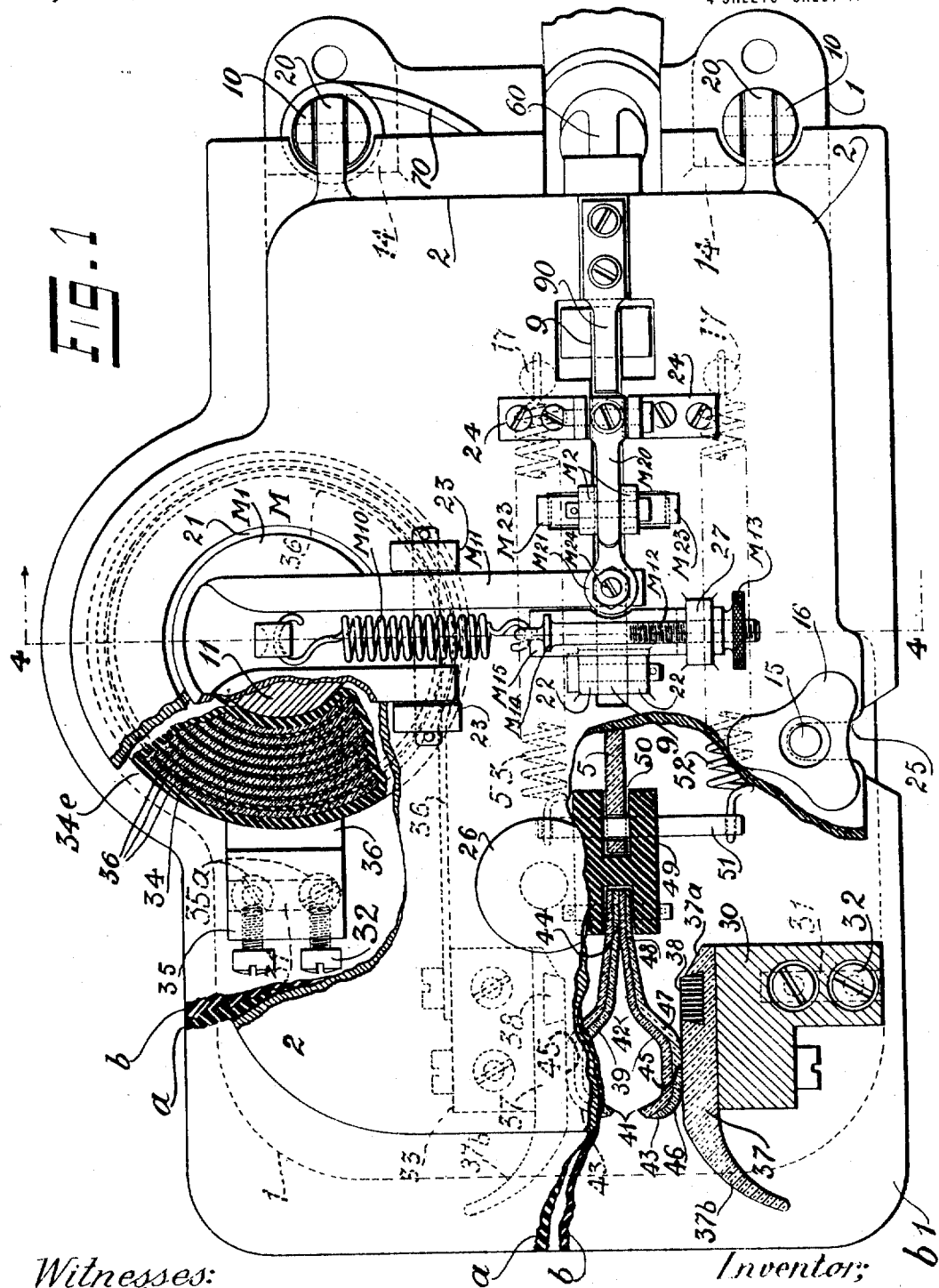

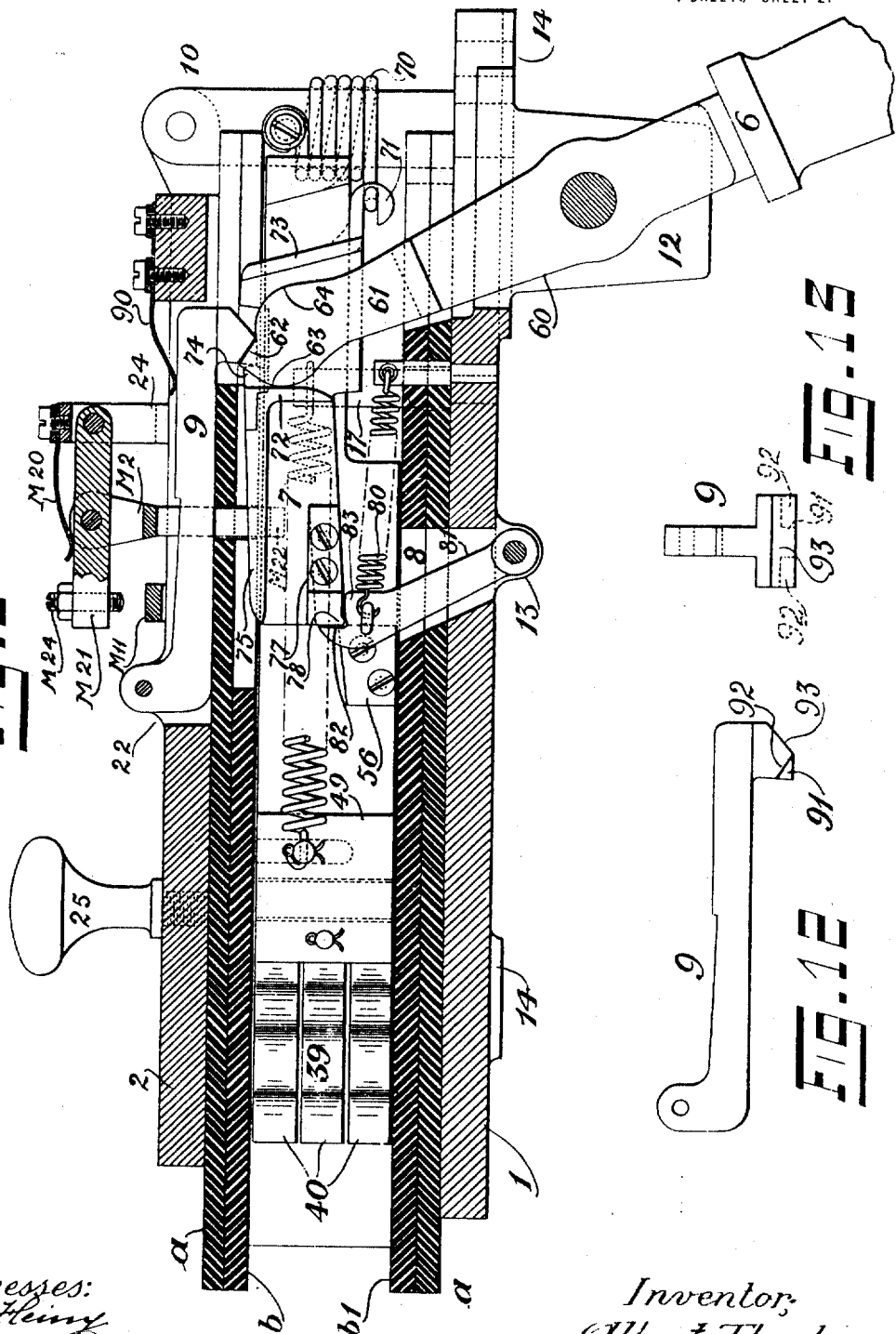
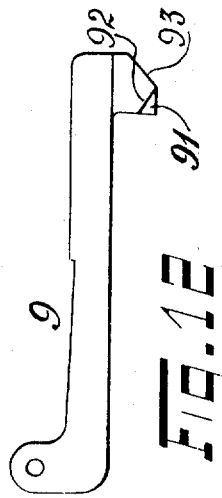

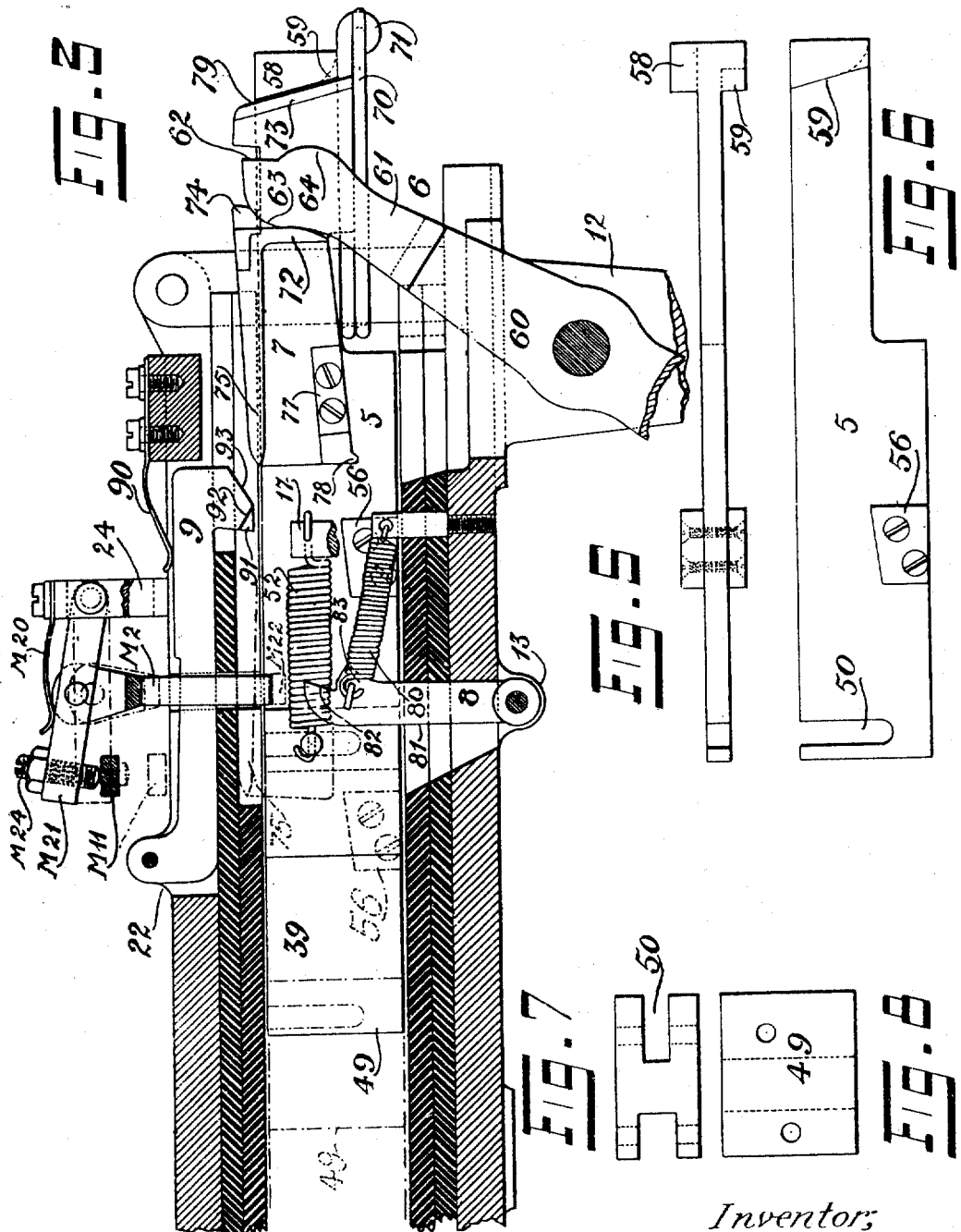

UNITED STATES PATENT OFFICE.

ALBERT THODE, OF HAMBURG, GERMANY.

AUTOMATIC ELECTRIC SWITCH.

1,235,859.  Specification of Letters Patent.  Patented Aug. 7, 1917.

Application filed October 21, 1913. Serial No. 796,393.

*To all whom it may concern:*

Be it known that I, ALBERT THODE, a subject of the Emperor of Germany, residing in Hamburg, Germany, have invented certain new and useful Improvements in Automatic Electric Switches, of which the following is a specification.

The primary objects of my invention are to protect electric motors and apparatus against excessive currents which, in the present practice, occasionally circulate through them, burn their contacts, scorch their insulation and otherwise injure and even destroy them; to automatically break the circuit whenever the current exceeds a predetermined maximum; and so long as the electric energy exceeds such a maximum, to render it impossible to reëstablish the circuit.

A secondary object is to provide hand-controlled electric switches such that while the operator initiates and directs their operations, the circuit-closing and breaking motions of the members which actually so function are spring-operated and as nearly as possible instantaneous; such that the operator, by making a long, slow, practicable motion, strains a spring or springs, accumulates energy therein and finally releases said springs and the electric bridge; which thereupon function practically instantly.

Further, my apparatus is so organized that, while circuit closing and breaking are spring-actuated and instantaneous, in case the bridge sticks and the springs cannot move or extract it, the operator can supplement their power with his own and forcibly move and extract it.

I render practicable the use of sliding and reciprocating electric members without parallel guides for the same and thereby facilitate their construction, make them more reliable and efficient and decrease the trouble and cost of their upkeep. The electric members of such switches are necessarily insulated. No known insulating material is as durable as metal and such as are non-inflammable are brittle. Therefore, in such apparatus, parallel guides for sliding and reciprocating members are generally short-lived, frequently out of order, and difficult to maintain.

I do away with parallel guides for such purposes and substitute for them spring resistances, the resultants of whose stresses coincide with the proper paths of the sliding or reciprocating members, so that the latter, when moved to strain the springs, or moved by them, naturally locate themselves in and follow the resultants of the spring stresses and are constrained to follow their proper paths by forces which render material guides superfluous.

In the drawings, Figure 1 is a general plan with the cover broken to show functioning parts, Fig. 2 an axial section showing the circuit closed, Fig. 3 a like view showing it broken, and Fig. 4 a transverse section on the line 4—4 of Figs. 1, 2 and 3. The remaining views are details of working parts, Fig. 5 being a plan and Fig. 6 a side view of the switch-slide; Fig. 7 a plan and Fig. 8 a side view of the insulating link which connects the slide and bridge; Fig. 9 a plan, Fig. 10 a side view and Fig. 11 an end view of the slide thrust-and-release dog, and Fig. 12 a side and Fig. 13 an end view of the latch.

In general terms, my invention comprises a bed plate 1 on which the principal members and all the electric members are assembled and a cover plate 2 hinged and adapted to be positioned parallel thereto, both plates being faced with non-conductors $a$, $b$ and $b^1$; a pair of poles 30 and 33, and a circuit-breaking electro-magnet whose coil 34 is an insulated spiraled plate or plates 36 and a section of the conductor connected with one of said poles; an elastic bridge 39 adapted to connect and be spring-withdrawn from the poles; a slide 5 linked by a non-conductor to the bridge; a pair of springs 52, 53 adapted to guide and retract the slide and bridge; a dog 7 riding on the slide, adapted to engage with and advance it and the bridge to close and to be disengaged from and permit it and the bridge to be spring-retracted, to instantly break the circuit; a dog-retracting spring 70; a hand apparatus or lever 6, adapted to advance and retract the dog, slide and bridge; a latch 9 to latch them in circuit closing position; a gearing M between the dog and the electro-magnet by which the latter can automatically release the slide and bridge from the dog and break the circuit whenever the current becomes excessive; and a member 8 adapted to coact with and disengage the dog from the slide when they are manually retracted and permit the slide and bridge to be spring-retracted and the circuit to be broken more quickly than it can be done manually.

As illustrated in the drawings, I provide a cast iron assembling or bed-plate, 1, adapted to be secured in a desired position and to support and suitably slotted for working members and having on its inward face hinge posts 10, spring abutment posts, and a magnet core 11; and on its outward face hand-lever pivot lugs 12, other pivot lugs 13 and screw-bosses 14 for its attachment to a suitable support.

A cover plate 2 is hinged by hinge-lugs 20 to said hinge posts 10, and positioned, when closed, parallel with the bed plate 1 by contact with suitable stops and bolted fast. To facilitate inspection and repairs, a marginal bolt slot 25 is made in the cover plate, and a bolt 15 is swiveled on the base plate and provided with a clover head nut 16 which can be quickly set or released to secure the cover plate or permit it to be swung on its hinges and display the apparatus; which can be readily done because the members fastened to the said plates respectively are merely engagingly positioned by them, when closed, and not positively connected. An armature opening 21, is made in the cover plate to register with the magnet core 11, and said plate is suitably slotted and perforated and provided with lugs 22 and 23, a post 27, and a detachably connected frame 24 for the support of working parts and a handle 26.

Both of said plates are inwardly faced with suitably attached plates $a$, $b$, $b^1$, which are non-conductors of heat and electricity. Slots and openings for working parts severally connecting with those in the plates 1 and 2 are made in the insulating plates and the armature opening 21 is preferably (but not necessarily) continued through the insulators attached to the cover plate. The insulating plates are larger than the base and cover plates and stand out from them on all except the hinge sides, to prevent sparks and protect the operator from accidental contacts.

All the electric members are connected with (but insulated from) the base plate 1. Of the two magnetic members one, the core, is integral with the base plate 1, the other, the armature, is hinged on the cover plate 2. The electric members comprise an elastic, generally V-shaped or open, bulbous prismatic bridge 39 adapted to be reciprocated on the switching axis, a pair of contact poles 30 and 33 whose opening is bisected by said axis, a binding post 35 and a coil 34 formed of an insulated, spiraled plate 36 which is preferably laminated to increase its efficiency, and which surrounds the core 11 and constitutes the conductor between one pole, 33, and the binding post 35. The pole 30 and post 35 each contain a conductor socket 31 and binding screws 32 for electric connections.

The poles 30, 33 have copper contact face plates 37, with carbon entrance plates 38 over which the bridge 39 slides when closing and breaking the circuit. The inner margins $37^a$ of said contact plates 37 are beveled and inwardly diverging so that the bridge will not contact therewith before or after leaving the carbon protectors 38, when closing or breaking the circuit. The outward limbs $37^b$ of said contacts 37 are curved and diverge outwardly, to form a converging entrance and facilitate entering the end of a bar or set, in case it becomes necessary to drive out a scorched bridge.

In order to insure instantaneous and effective contacts, the bridge 39 is slotted or divided parallel to the plate 1 into a plurality of lifts 40 and each lift comprises two laminated leaves 41, each made of a plurality of plates, 42, 43. The plates 42, 43 of each leaf 41 are formed and brazed or welded, each pair of leaves is united in a lift 40 and the lifts are united at the shank 44 of the bridge. It is obvious that a plurality of plates can be brazed or welded together at the shank location, folded to form the shank, pressed over a former, between dies, to give the desired bridge contour, and subsequently slotted to form the lifts. Laminating the leaves enables me, when I do desire, to use a highly resilient metal for the inner plates and a highly conductive metal for the contact surfaces of the bridge.

The bridge shank 44 is drilled for a connecting pin. In its general form, the bridge is an open, divided, bulbous, transversely elastic prism with substantially parallel contact cheeks 45, merged into outward and inward beveled faces 46 and 47 and joined to the shank 44 by slightly divergent elastic extensions 48, which are long enough to give the necessary transverse elasticity. The beveled faces 46 and 47 guide and ease the entrance and passage of the bridge between the entrance protectors 38 and contact plates 37, and its withdrawal. The bridge is faced parallel with and slides between the insulating face plates $b$ and $b^1$, and its shank is pivotally connected by an insulating link 49 with the slide 5.

As illustrated (Figs. 1, 7 and 8) said link is doubly slotted; the bridge shank 44 is pinned in one slot and the slide 5 enters the other and by a slot, 50, engages a pin 51 which extends through the walls of said link and whose ends form the movable points of attachment for retraction springs, 52, 53, strained between the bridge and slide and abutment posts 17, fixed in the base plate 1. The lower face of the slide 5 is plane and bears on the insulating plate $b^1$. The slide reciprocates on the switch axis and the strengths of the springs 52 and 53 are so proportioned to their respective distances from said axis (and to their inclination therewith if they be inclined thereto) that the resultant of any stresses which may exist in them coincides with said axis and the coaction of such stresses with a translating force applied to or resistance of said slide, causes it to tend to place itself and to move along said axis. The forces as previously noted guide the reciprocating members and material guides are superfluous.

Under all circumstances, except if the bridge be fused to the contact plates 37, the circuit is broken practically instantaneously by the release and recoil of the springs 52 and 53. The slide 5 and bridge 39 are advanced, the springs 52—53 strained and the circuit closed, and their retraction and the breaking of the circuit are initiated by hand power applied to the manual-operation mechanism or lever 6; and to effect practically instantaneous retraction and circuit-breaking, I interpose between said operation mechanism 6 and the slide 5, the engaging and releasing mechanism or dog, 7, and provide the automatic disengaging mechanism or arm, 8, adapted to disengage the dog 7 from the slide 5 shortly after their retraction is initiated by the mechanism 6.

The mechanism 6 comprises a lever 60, pivoted in the lugs 12 of the base-plate 1 and having an outer handle and at the other end a forked head 61 whose forks embrace the dog 7 and the slide therein, and are formed with transverse beveled faces 62 adapted to throw out the latch 9 (to be described) and cam-like driving faces 63 and 64 adapted to engage and reciprocate the dog 7, and thereby advance and initiate the retraction of the slide and bridge.

The slide-engaging and releasing dog 7 (detailed in Figs. 9, 10 and 11) is a bar of channel section, rides the slide and is connected with its independent retraction spring 70, preferably by means of an outwardly-extending hook 71, formed on one of its flanges. The spring 70 is illustrated as a coil which envelops a hinge post 10, is fixed thereto by one end, and engages the hook 71 with the other. Adjacent to the outward extremity of the dog a pair of shoulders 72, 73 are formed on its flanges adapted respectively to engage the driving faces 63 and 64 of the lever head 61, to reciprocate said dog, said shoulders being spaced somewhat wider than the width of said lever head, so that it can be retracted from its advanced position and the inner shoulders 72, far enough to throw out said latch 9 before engaging the shoulders 73 and beginning to retract the dog.

The inward shoulders 72 are substantially perpendicular to the switch axis so that when advanced by the lever 6 the dog and slide tend to move along said axis, without undue friction. The outward shoulders 73 are inclined so that normals to them diverge outwardly and upwardly from said axis; and the slide 5 terminates outwardly in a head 58 whose inward faces 59 are similarly inclined and one of which is slightly cut away to give clearance for the hook 71 of the dog. When the bridge 39 sticks and has to be forcibly withdrawn by means of the lever 60, the force applied through its faces 64 to the outward shoulders 73 of the dog, forces the inclined end 79 thereof against the likewise inclined shoulders 59 of the slide head; and the direction of the retracting force being normal to said shoulders and divergent from the switch axis, the outer ends of the slide and dog are lifted from the base plate insulator $b^1$ and ride on the lever 60 and its pivot. At the same time the inward end of the dog rides on the arm 8 and its pivot. The slide is lifted from the insulator $b^1$, which is thus preserved from destructive friction. Further, the pull on the pin which connects the insulating link 49 with the bridge shank is divergent and resoluble into two components one of which, acting with an arm of considerable length, exerts a torque upon the points of adhesion and tends to twist them free while the other tends to withdraw the bridge along the switching axis.

Between its shoulders 72 and 73 the web of the dog is slotted and the inward wall of said slot is formed by a hardened steel catch 74 adapted to be engaged by said latch 9. Inwardly from the shoulders 72 the web of the dog extends beyond its flanges to form inwardly tapered tongues 75 terminating in edges 76 and adapted, when the dog is advanced, to surely engage hooks formed on a draw bar $M^2$ operably connected with the magnet armature $M^1$.

Hardened steel thrust blocks 77 are fastened to the flanges at their inward ends to engage corresponding abutment blocks 56, on the slide 5; and one of said thrust blocks has a transverse, inwardly-lipped extension 78 adapted to engage the release arm 8, by which the dog is automatically disengaged from the slide after its retraction is manually initiated by the lever 6.

The latch 9 (Figs. 12 and 13) is pivoted at one end on the lugs 22 of the cover plate 2; normally its body lies in an axial slot formed in said plate and it is engagingly depressed by a spring 90, preferably a plate spring fastened to the cover plate at the outward end of said slot; it has a hardened steel head formed with an inwardly shouldered catch 91 adapted to engage the catch 74 of the dog, a pair of beveled lifting faces 92 at the sides of said catch and, diverging therefrom, a beveled outward face 93; the faces 92 being adapted to throw out the latch when retraction is initiated and the face 93 to enable the lever head 61 to raise and pass the latch when the switch is being closed. When the switch is being thrown, the latch spring 90 presses the latch against the dog and the slide against the insulator $b^1$.

The manually operated disengaging device 8 comprises an arm 81 pivoted in the lugs 13 of the base plate somewhat in the rear of the advanced position of the thrust blocks 77 of the dog, and having a rabbet 82 formed in its free end adapted to engage the lipped projection 78 of said block; and a spring 80 adapted to normally hold said arm 81 upright. When the dog, slide and bridge are advanced the inward end of the projection 78 contacts with the cheek 83 of the arm 81, swings its free end inwardly and depresses it until the projection 78 can enter the rabbet 82, Fig. 2. When the dog is retracted, the spring 80 retracts the arm 81 and causes its free end to rise, lift the inward end of the dog and the thrust blocks 77, and disengage them from the abutments 56 of the slide and release it and the bridge, so that they can be retracted by the springs 52—53.

I provide magnet-operated releasing apparatus M adapted to disengage the dog 7 from the slide 5 and permit it and the bridge 39 to be retracted and the circuit broken by the springs 52, 53, whenever the current exceeds a predetermined maximum and to prevent the circuit from being reëstablished so long as the electric energy supply is excessive. This apparatus comprises the electro-magnet formed of the core 11 and the coil 34; an armature $M^1$; a hooked draw-bar $M^2$ adapted to engage the tongues 75 of the dog when it is advanced; and a lever gearing connecting the armature $M^1$ and draw-bar $M^2$.

The armature $M^1$ is formed on a lever $M^{11}$, pivoted on the lugs 23 of the cover plate and normally retracted by a spring $M^{10}$ strained between it and an adjusting screw $M^{12}$, which is illustrated as engaging the post 27 of the cover plate, adjustable by means of a knurled nut $M^{13}$, and having a polygonal head $M^{14}$ supported by a slide plate $M^{15}$ attached to the cover plate, which mode of support prevents the screw from rotating and also reduces friction when it is adjusted.

The draw head $M^2$ extends through a slot in the cover plate, is illustrated as forked at both ends, pivoted at its outer end on a secondary lever $M^{21}$ and terminating, at its inner end, in opposite inturned hooks $M^{22}$ adapted to engage the dog tongues 75, and normally positioned by a spring $M^{20}$ with its shoulders $M^{23}$ in contact with the cover plate 2 and its hooks $M^{22}$ inward of their functioning location, as illustrated in Fig. 4; and its stroke is adjusted by a set screw, $M^{24}$, located in the free end of the secondary lever $M^{21}$ in line with the primary lever $M^{11}$.

The secondary lever $M^{21}$ is fulcrumed in the frame 24.

When the current passing through the plate 36 of the coil 34 is less than the predetermined maximum, the spring $M^{10}$ retracts the armature $M^1$ and its lever $M^{11}$ contacts with the cover plate; the spring $M^{20}$ holds in the draw head $M^2$ and its hooks $M^{22}$ inwardly of their functioning position, and consequently the magnetic disengaging apparatus M is inactive and the circuit is manually controllable. But when the current becomes excessive the pull of the core 11 is so augmented that it successively overcomes the resistance of the springs $M^{10}$ and $M^{20}$, pulls in the armature $M^1$, lifts the free ends of its primary lever $M^{11}$ and the secondary lever $M^{21}$, and the draw bar $M^2$ so that its hooks $M^{22}$ engage the tongues 75 of the dog 7, lift its inward end and disengage its thrust blocks 77 from the abutment blocks 56 of, and release the slide 5; whereupon the springs 52 and 53 retract the slide and bridge, and break the circuit.

The circuit is reëstablished by manipulating the lever 60 as before described; but in case the energy supplied to the conductor continues to be excessive its reëstablishment will be found impossible because the instant the bridge closes the gap, current passes through the conductor 36 of the coil and excites the core 11; and the energy of said current expends itself in the work necessary to overcome the first resistance it encounters, namely, to attract and pull in the armature $M^1$ and operate the release mechanism M, as above described, and again instantaneously break the circuit before the current can affect the protected apparatus.

Further, in my apparatus the bridge is so connected to the hand lever that the operator can not cause damage by forcibly returning and holding the bridge in contact with the poles against the effort of the retraction mechanism to break the circuit, because the connection between the hand lever and the bridge is made by a supplemental mechanism, namely, the dog 7, the potential control of which resides in the automatic mechanism M and which, when such mechanism is acting, cannot be controlled, in any manner, by the operator.

The coil 34 is of novel and improved construction and can be put in place, connected, removed and replaced with great facility. Its conductor 36, is a plate or preferably a plurality of plates, whose width substantially equals the axial dimension of the coil and which are insulated, wound in a spiral adapted to envelop the core and for connection in circuit by permitting an end to extend tangentially a convenient distance from the outer spiral and perforating it for the screws which attach it to the contact pole 33, the other end of the plates being bent backwardly from the inner spiral across the bottom seating face of the coil and attaching it under the binding post 35, by means of the screws 35ª.

After the conductor 36 is wound as above described, its spirals are inclosed in a suitable insulating envelop 34ª, and the coil is complete, ready to be placed in position by slipping it on the core 11 into a socket prepared for it in the insulator $b^1$ and with its tangent plate against the pole 33 and screwing it thereto and fastening the binding post 35 to the plate $b^1$, which is preferably done by screws 35ª (Fig. 1) driven through the insulators $a$ and $b^1$ into tapped holes in the post, and entered through large holes in the base plate 1.

It is to be noted that the latch 9 and magnetic release apparatus M are mounted on the cover plate 2 and accessible at all times; that such parts have no physical unions whatever with the parts assembled on the base plate but are operatively positioned relatively thereto by closing the cover plate; and that except the pivoted members, the moving parts assembled on the base plate are slipped together and when the cover is thrown back, are accessible and can be pulled or knocked apart without difficulty.

For most uses, to save time and trouble, it is highly desirable that the operator should be able to tell at a glance, by the position of the hand lever, whether the circuit is closed or broken. This is true of the switches I have made, substantially as above described, and put in use. Ordinarily I make the engagement of the latch hook 91 and dog catch 74 rather sensitive, so that when the dog is operated by the electromagnet to release the slide and bridge, their violent spring-actuated retraction jars the latch loose from the dog which is thereupon retracted by its spring 70 and swings the hand lever from the position of Fig. 2 to that indicated in Fig. 3. But where the switches are subjected to great vibration which might shake free the latch and dog, I make their engagement firm and provide a positive release operable by the magnet and preferably consisting of a shoulder $M^{29}$ (Fig. 2) on the draw bar $M^2$ adapted, when it is operated by the magnet, to lift the latch 9 and free the dog 7, so that it will be retracted by the spring 70 and swing the lever 60 to the position indicated in Fig. 3, which corresponds with a broken circuit, as that of Fig. 2 does with a closed one. For ordinary uses this positive release has proved unnecessary.

I claim as new and desire to protect by Letters Patent:

1. A quick-break electric switch comprising a base plate, a cover plate hinged and adapted to be bolted thereto and substantially parallel therewith, insulating plates connected with said base and cover plates, a pair of contacts fastened to said base plate insulator and adapted to be connected in circuit, a bridge and a slide connected therewith adapted to be reciprocated on said base insulator to bridge and open the gap between said contacts, a pair of springs connected with said bridge and base plate and adapted to retract said bridge, a hand lever pivoted on said base plate and adapted to reciprocate said slide and bridge, an engaging and releasing dog mounted on said slide, engaged with said lever and adapted to engage and release said slide and bridge, a latch adapted to engage said dog and retain it and the slide and bridge in operative position and to release the same; and a disengaging arm pivoted on said base plate adapted to engage and be rocked by movements of said dog and to operate it to release and cause said bridge to be retracted by said springs after the circuit-breaking motion has been initiated by said hand lever.

2. A quick-break electric switch comprising a base plate, a cover plate hinged and adapted to be bolted thereto and substantially parallel therewith, insulating plates connected with said base and cover plates, a pair of contacts fastened to said base plate insulator and adapted to be connected in circuit, a bridge and a slide connected therewith adapted to be reciprocated on said base insulator to bridge and open the gap between said contacts, a pair of springs connected with said bridge and base plate and adapted to retract said bridge, a core attached to said base plate, a coil enveloping said core and formed of an electric main connected at one end of said contacts and at the other adapted to be connected in circuit, a hand lever pivoted on said base plate and adapted to reciprocate said slide and bridge, an engaging and releasing dog mounted on said slide, engaged with said lever and adapted to engage and release said slide and bridge, a latch adapted to engage said dog and retain it and the slide and bridge in operative position and to release the same; a disengaging arm, pivoted on said base plate, adapted to engage and be rocked by movements of said dog and to operate it to release and cause said bridge to be retracted by said springs after the circuit breaking motion has been initiated by said hand lever, and an armature and a draw bar operably connected therewith mounted on said cover plate, adapted to be operatively positioned respectively relatively to said core and dog by closing said cover plate, said armature adapted to be drawn by said core when the current attains a predetermined maximum and when so drawn to operate said draw bar, and cause it to engage and operate said dog to release said bridge so that it can be spring-retracted.

3. A quick-break electric switch comprising a support, insulators adapted to insulate electric members, a pair of contacts adapted to be connected in circuit, a bridge adapted to be operated to close and break the circuit, hand-operated means adapted to close and to initiate the breaking of the circuit, resilient means connected with said bridge, adapted to be strained by said hand-operated means and to break said circuit, engaging and releasing means interposed between said hand operated means and said bridge and adapted to engage and release it, disengaging means adapted to be operated by said interposed means and to disengage it from and release said bridge after the circuit-breaking motion has been initiated by said hand operated means, and electrically operated circuit-breaking means located in and operated by the circuit and adapted to disconnect said bridge from said interposed means and hand operated means and cause it to be retracted by said resilient means whenever the current attains a predetermined maximum.

4. A quick-break electric switch comprising a base plate, a cover plate hinged and adapted to be bolted thereto and substantially parallel therewith, insulating plates connected with said base and cover plates, a pair of contacts fastened to said base plate insulator and adapted to be connected in circuit, a bridge and a slide connected therewith adapted to be reciprocated on said base insulator to bridge and open the gap between said contacts, a pair of springs connected with said bridge and base plate and adapted to retract said bridge, a hand lever pivoted on said base plate and adapted to reciprocate said slide and bridge, an engaging and releasing dog mounted on said slide, engaged with said lever and adapted to engage and release said slide and bridge, a spring connected with and adapted to retract said dog, a latch adapted to engage said dog and retain it and the slide and bridge in operative position and to release the same; and a disengaging arm pivoted on said base plate, adapted to engage and be rocked by movements of said dog and to operate it to release and cause said bridge to be retracted by said springs after the circuit breaking motion has been initiated by said hand lever.

5. A quick-break electric switch comprising a base plate, a cover plate hinged and adapted to be bolted thereto and substantially parallel therewith, insulating plates connected with said base and cover plates, a pair of contacts fastened to said base plate insulator and adapted to be connected in circuit, a bridge and a slide connected therewith adapted to be reciprocated on said base insulator to bridge and open the gap between said contacts, a pair of springs connected with said bridge and base plate and adapted to retract said bridge, a core attached to said base plate, a coil enveloping said core and formed of an electric main connected at one end to one of said contacts and at the other adapted to be connected in circuit, a hand lever pivoted on said base plate and adapted to reciprocate said slide and bridge, an engaging and releasing dog mounted on said slide, engaged with said lever and adapted to engage and release said slide and bridge, a spring connected with and adapted to retract said dog, a latch adapted to engage said dog and retain it and the slide and bridge in operative position and to release the same; a disengaging arm, pivoted on said base plate, adapted to engage and be rocked by movements of said dog and to operate it to release and cause said bridge to be retracted by said spring after the circuit breaking motion has been initiated by said hand lever, and an armature and a draw bar operably connected therewith mounted on said cover plate; adapted to be operatively positioned respectively relatively to said core and dog by closing said cover plate; said armature adapted to be drawn by said core when the current attains a predetermined maximum and when so drawn to operate said draw bar, and cause it to engage and operate said dog to release said bridge so that it can be spring-retracted.

6. An electric quick break switch comprising a support, insulation adapted to insulate electric members, a pair of contacts adapted to be connected in circuit, a bridge adapted to close and open the gap between said contacts, resilient means adapted to cause said bridge to open said gap, an electromagnet whose conductor is included in the circuit controlled by said bridge, a hand-operated lever adapted to reciprocate and to indicate the position of said bridge, engaging and releasing means interposed between said lever and bridge, and disengaging means adapted to be operably engaged with said interposed means and to disengage it from said bridge after the circuit breaking motion has been initiated by said lever, said interposed means adapted to engage and be disengaged from and release said bridge and to be operably connected with said magnet and thereby so disengaged whenever the current attains a predetermined maximum.

ALBERT THODE.

Witnesses:
JOHN MORRIS,
H. D. PENNEY.

Copies of this patent may be obtained for five cents each, by addressing the "Commissioner of Patents, Washington, D. C."